May 1, 1945.  J. W. JONES, JR  2,375,111
SOUND REPRODUCER TEST METHOD AND SYSTEM
Filed Oct. 12, 1943
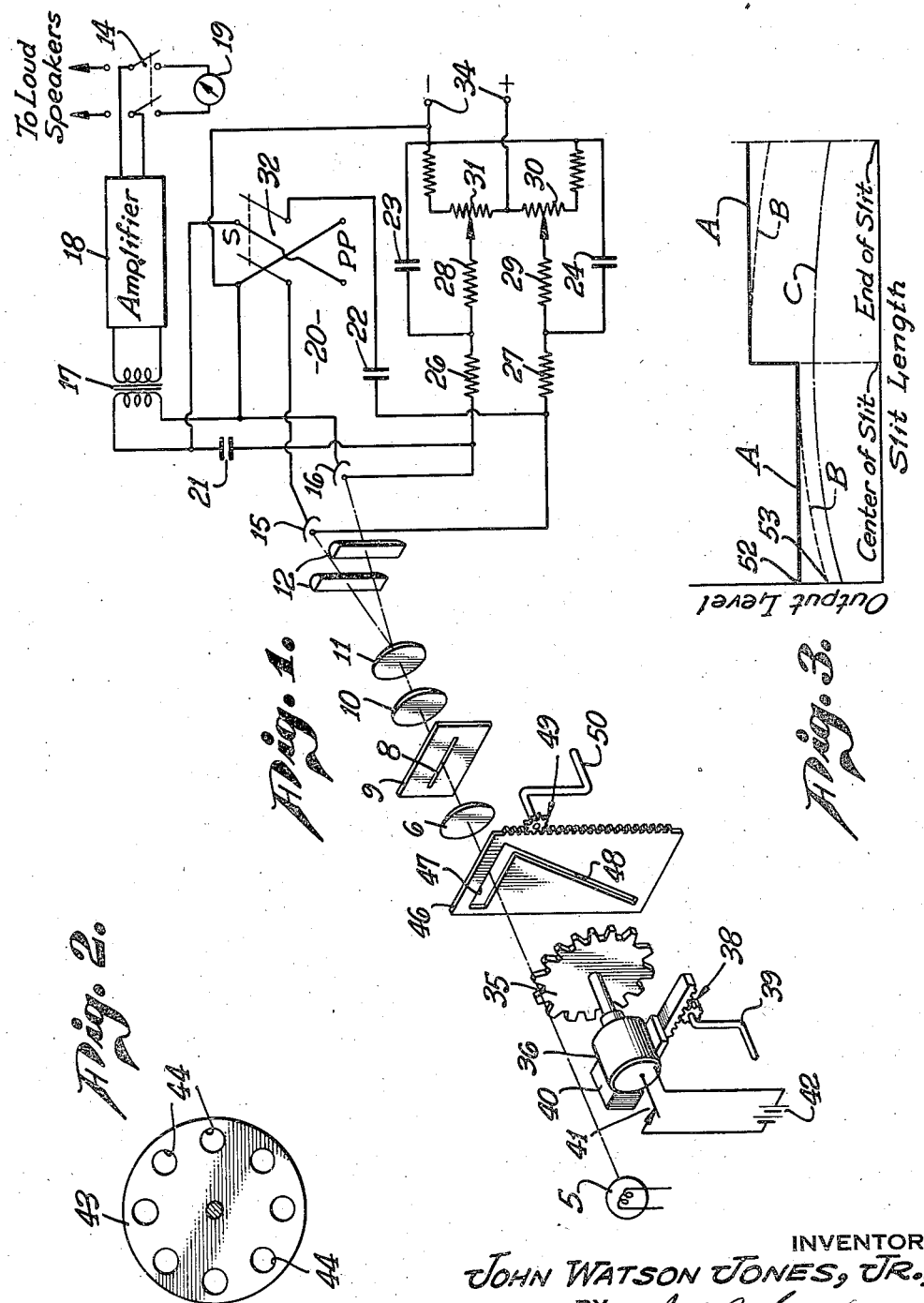
INVENTOR.
JOHN WATSON JONES, JR.,
BY
ATTORNEY.

Patented May 1, 1945

2,375,111

UNITED STATES PATENT OFFICE 2,375,111

SOUND REPRODUCER TEST METHOD
AND SYSTEM

John Watson Jones, Jr., Los Angeles, Calif., assignor to Radio Corporation of America, a corporation of Delaware Application October 12, 1943, Serial No. 505,918

8 Claims. (Cl. 179—100.3)

This invention relates to sound motion picture reproducing apparatus and particularly to a testing, checking, and measuring system for a sound reproducer system.

The principal elements for reproducing sound from motion picture film are a light source, optical elments for defining the light to a fine line beam for projection on the sound track of the film, a photoelectric cell for receiving the light as modulated by the sound track, electrical current amplifiers, and a loud speaker or speakers for translating the electrical currents into sounds. In systems becoming more prevalent for sound recording and reproduction is the use of a push-pull type of sound track requiring two photoelectric cells, either separate or in a common envelope, and associated push-pull circuits.

In the use of either a single or push-pull photocell system, distortion may be introduced into the reproduced sound in several ways. First, if the narrow light beam projected on the film is not uniform in intensity throughout its length, sound waves of different amplitudes will not be reproduced in their proper amplitude relationship. To test or measure the uniformity of the light beam as it is defined by the light slit, several systems have been proposed, one of which is shown in Collins U. S. Patent No. 2,260,702 of October 28, 1941.

In reproducing systems employing two photocells connected in a push-pull relationship, the output circuit of the cells is generally arranged so that the two cells may also be connected in parallel for the reproduction of standard single track film. Switching arrangements of this type are shown in Belar Patents 2,152,173 of March 28, 1939, and 2,178,219 of October 31, 1939. When photocells are used in this manner, it is necessary that they and their circuits be balanced in order to prevent distortion being introduced into the reproduced sound.

Another desired check of a sound reproducer is when more than one is employed to exhibit a picture as in theaters. In this case, a test or measurement is necessary of the output level of each reproducer to insure that the reproduced sound level is not increased or decreased when the changeover is made from one reel to another. Thus, each reproducer should be adjusted so that it has the same output level as the other reproducers with respect to a definite input level.

The present invention, therefore, is directed to a testing and measuring system which may be employed to check uniformity of slit illumination, balance of the push-pull tubes and circuits, and the output level of the reproducer, the principal object of the invention being to facilitate the making of these tests and measurements.

Another object of the invention is to provide a testing and measuring system in which a plurality of tests and measurements of a sound reproducer may be made rapidly and accurately.

A further object of the invention is to provide a system for testing a sound film reproducer for uniformity of slit illumination, balance, and output level.

A still further object of the invention is to provide a testing and measuring system as an adjunct to a motion picture sound reproducing system.

Although the novel features which are believed to be characteristic of this invention will be pointed out with particularity in the appended claims, the manner of its organization and the mode of its operation will be better understood by referring to the following description read in conjunction with the accompanying drawing forming a part hereof, in which:

Fig. 1 is a combination diagrammatic and schematic drawing of a sound reproducing system embodying the invention.

Fig. 2 is a modification of an element of the system of Fig. 1, and

Fig. 3 is a graph illustrating the operation of the testing system.

Referring now to Fig. 1, light from a light source 5 is collected by a lens 6 and shaped into a narrow beam by a light slit 8 in a mask 9, the emergent light being project by lenses 10 and 11 to a pair of separating lenses 12 for projecting each half of the beam onto one of a pair of photoelectric cells 15 and 16. In the normal reproducing system, the film may travel between the lenses 10 and 11, but one of the features of the present invention is that a test simulating the reproduction of film may be made without the use of film.

The output of the cells 15 and 16 is impressed through a transformer 17 upon an amplifier 18 feeding a meter 19 when a switch 14 is thrown to its lower position, over a coupling circuit 20 which includes condensers 21, 22, 23, and 24, resistances 26, 27, 28, and 29, and potentiometers 30 and 31. A two-poled double-throw switch 32 interconnects the tubes 15 and 16 to the amplifier 18. When the blades of the switch 32 are in the upper position, the photocells 15 and 16 are connected in parallel, and when the blades of the switch 32 are in the lower position, the photocells 15 and 16 are connected in a push-pull relationship. Anode energy is supplied to the photocells from any suitable direct current power source connected to terminals 34. The sliders on potentiometers 30 and 31 will adjust the anode potential supply to the respective cells 15 and 16 to vary the output of each cell. The details of such a circuit are disclosed and claimed in the above-mentioned Belar patents.

The reproducing system as above-described is of the standard type of sound reproducing system adapted to reproduce both standard and push-pull sound records. The present invention resides in an adjunct to such a system which includes a toothed chopper wheel 35 driven by a motor 36 mounted for movement of the wheel 35 in and out of the light beam by means of a rack and pinion combination 38 operated by a bell crank 39. This chopper wheel system is so arranged that upon positioning the motor against the block 40, the contacts of a switch 41 are closed to energize the motor from a source of power such as a battery 42. In this position, rotation of the wheel 35 periodically interrupts the light, producing substantially 100% modulation of the light beam being impressed on the photocells 15 and 16, thus simulating a constant frequency sound track being passed through the light beam. Another type of chopper wheel for this purpose is shown in Fig. 2 at 43 wherein a row of holes 44 are positioned adjacent the perimeter of the wheel. The teeth of the chopper wheel 35 and the holes of the wheel 43 shown in Fig. 2 should be designed with respect to the speed of rotation of the wheel so that the frequency of interruptions of the light beam is substantially 1000 cycles, while the shape of the teeth and of the holes and their disposition on and in the wheel are such as to provide a wave form approximating a sine wave. In this manner, the actual conditions of operation of the system are more closely simulated.

A further element of the present test system is a matte or mask 46 having an L-shaped slot therein which mask is preferably disposed intermediate the wheel 35 and the lens 6. The matte 46 may be mounted in the system so that the wide horizontal slit portion 47 is in line with the optical axis and does not interfere with the normal reproduction of sound film. This matte is so arranged as to be movable at right angles to the optical axis and normal to the slit portion 47 by means of a rack and pinion 49 and bell crank 50. As the matte is moved, it scans the light beam along the length of the slit passing an amount of light determined by the width of the slit portion 48. This adjunct is used to check the uniformity of the illumination of the slit 8 and mask 9 and to make balance tests and measurements. It is understood, of course, that a device such as shown in the above-mentioned Collins patent may also be employed for this purpose.

The operation of the system will now be described. By operating bell crank 39, the wheel 35 is moved into the light beam and the motor 36 energized. The matte 46 is positioned as shown in the drawing. The switch 32 is now thrown to its upward position to connect cells 15 and 16 in parallel. With this adjustment, which corresponds to substantially 100% modulation, the amplifier should be adjusted so that the meter 19 reads an output level in the neighborhood of zero db. The uniformity of slit illumination and balance may now be tested by moving the matte 46 upwardly and downwardly so that the slit portion 48 scans the light beam.

Referring now to Fig. 3 showing the variation in output level with slit length, as soon as the slit 48 becomes effective at one end of the beam, the meter reading drops to indicate the response of one cell to only that portion of the light beam passing the slit 8 as limited by the slit 48. This output level may be as shown at point 52 on solid curve A. If the light beam is uniform across the left half of the slit, the meter reading will remain constant while the slit 48 scans that portion of the slit. At the center of the slit, the solid curve is shown in an abrupt rise. This is caused by an unbalanced condition of the cells, the cell receiving light from the right hand half of the slit being more sensitive than the other. However, as the slit 48 scans the remaining half of the light beam, the meter reading remains constant, indicating that the right hand half of the light beam is also uniform. Thus, both the condition of balance and slit light intensity are readily detected. If the meter reading followed the dotted curve starting at point 53, both light slit non-uniformity and an unbalance would be indicated. If the same amount of light beam non-uniformity existed, but the cells were balanced, the shape of the curve would be as indicated by the dot and dash curve C. The necessary lamp filament or optical element adjustments can be made to correct for light beam non-uniformity.

To check the photocell balance, the switch 32 is thrown to its lower position which connects the cells in a push-pull relationship. With the light slit uniform and the slit portion 47 in the position shown in the drawing, the meter should now read zero if the cells are in balance, inasmuch as each cell is connected 180 degrees out of phase and the output currents are equal. Should there be any unbalance of the cells, however, the differential current will be indicated on meter 19. In Fig. 3 this differential would be the difference between the horizontal sections of curve A in case no correction of balance had been made during the first test. To correct for unbalance, the anode potentials on cells 15 and 16 are adjusted at potentiometers 30 and 31 to bring the meter reading to zero. A slit uniformity test may also be made with the cells connected in push-pull by passing the slit 48 of the matte 46 across the light beam. Since only a single cell is functioning at any instant, the meter will provide the same indications as shown in Fig. 3 when the cells are connected in parallel.

After the slit intensity and balance are tested and adjusted if necessary, an output level check is readily made with the cells connected in parallel and using section 47 of the matte 46, or in push-pull and using section 48 of the matte. The amplifier may be set to provide a predetermined output to coincide with other reproducers operating in association therewith.

From the above, it is realized that several tests and measurements may be very quickly made by simply moving the motor and inserting the wheel 35 into the light beam and manipulating the matte 46 across the beam as explained above. The system is readied for sound reproduction by placing the matte 46 as shown in the drawing, removing the wheel out of the light beam, and throwing the switch 14 to its upper position to connect the output of amplifier 18 to the loud speakers or other amplifiers.

I claim as my invention:

1. In a testing and measuring system for a plural photocell sound reproducer, the combination of a light source, means for defining the light from said source into a narrow beam, means for projecting each half of said beam to a different photoelectric cell, a meter, means intermediate said cells and said meter for connecting the outputs of said cells in parallel or in a push-pull relationship, a light interrupting means adapted to be interposed in said light beam for intermittently intercepting said light, and a masking means adapted to scan said light beam.

2. A testing and measuring system for a sound reproducer having a light source, a light beam defining means, a plurality of photocells, and means for indicating the output of said cells when connected in either parallel or push-pull, comprising a light chopper wheel, a motor for rotating said chopper wheel, means for positioning said wheel in and out of said light beam, a mask, and means for actuating said mask to scan said light beam during rotation of said chopper wheel, the scanning of said light beam by said mask permitting the output of each photocell to be measured separately and adjusted for equality.

3. A plural photocell sound reproducer testing system comprising a light interrupting means adapted to be positioned in the light beam of said reproducer, a mask adapted to scan the light beam of said reproducer for limiting light to said photocells at mutually exclusive periods, and means for indicating the individual output of said cells and the combined output of said cells for determining the balance thereof and the intensity of said light beam.

4. The method of determining the balance of a plural photocell sound reproducing system comprising impressing a light beam on said photocells, periodically interrupting said light beam, and scanning said light beam to light impress said photocells at mutually exclusive intervals of time.

5. The method of testing a plural photocell sound reproducing system comprising impressing a light beam on the photocells of said system, intermittently interrupting said light beam of said system to produce an alternating current, and scanning said light beam for impressing the light of said beam on said cells at mutually exclusive time intervals to determine the individual output of said cells for predetermined sections of each half of said light beam, and means for varying the polarizing potential supplied to said cells to produce the same output level from each of said cells.

6. A testing and measuring system for a combination standard and push-pull sound reproducing system comprising means for producing a light beam, a light interrupting means adapted to be positioned in said light beam during test and out of said light beam during normal operation of said reproducing system, a mask having a pair of slits therein, one of said slits simultaneously passing all of the light of said beam and the other of said slits being adapted to pass a predetermined amount of the light of said beam as said slit is moved across said beam, a meter, and means for interconnecting the photocells of said reproducing system in parallel and in push-pull relationship to said meter, the indications of said meter during the movement of said second mentioned slit across said beam indicating the light beam intensity and the output level of said cells.

7. A testing and measuring system for a plural photocell sound reproducing system comprising light interrupting means for the light beam of said reproducing system, scanning means for said light beam, a pair of photocells, each cell being adapted to receive substantially one-half of said light beam, and means for indicating the output level of each of said cells when receiving one-half of said light beam and when receiving a predetermined portion of either half of said light beam.

8. A system in accordance with claim 7 in which said first mentioned means includes a motor driven light chopper wheel adapted to be adjusted into and out of said light beam and said scanning means includes a mask having an L-shaped slit therein.

JOHN WATSON JONES, Jr.